United States Patent [19]

Schmitt-Matzon

[11] Patent Number: 5,218,996

[45] Date of Patent: Jun. 15, 1993

[54] THREE-WAY THREE-POSITION SOLENOID VALVE

[75] Inventor: Eric J. Schmitt-Matzon, Shelby, N.C.

[73] Assignee: Fasco Controls Corporation, Shelby, N.C.

[21] Appl. No.: 864,432

[22] Filed: Apr. 6, 1992

[51] Int. Cl.⁵ ............... F15B 13/044; F16K 11/24
[52] U.S. Cl. .................... 137/596.17; 251/129.1; 303/119.2
[58] Field of Search ............. 137/596.17; 251/129.1; 303/119 SV

[56] References Cited

U.S. PATENT DOCUMENTS

| | | | |
|---|---|---|---|
| 4,619,289 | 10/1986 | Tsuru et al. | 137/596.17 X |
| 4,655,249 | 4/1987 | Livet | 137/625.65 X |
| 4,922,961 | 5/1990 | Maehara | 137/596.17 |
| 5,125,432 | 6/1992 | Fuji et al. | 137/596.17 |

Primary Examiner—Gerald A. Michalsky
Attorney, Agent, or Firm—Shlesinger Fitzsimmons Shlesinger

[57] ABSTRACT

The device comprises a housing having therein a valve chamber, fluid inlet and exhaust ports opening on opposite ends, respectively, of the chamber, and an outlet port for connection to fluid pressure operated apparatus. Two solenoid coils are wound in the housing to surround said chamber and two armatures which are mounted in the chamber to reciprocate independently of each between said inlet and exhaust ports. Two springs normally urge said armatures to first limit positions in which a valve on one armature closes the exhaust port, and a valve on the other armature opens the inlet port to place it in communication with the outlet port. When both solenoid coils are energized the armatures shift in the same direction to close the inlet port and open the exhaust port to exhaust fluid from the outlet port to a sump. One coil alone may be energized to shift one armature to close the inlet port without causing the other armature to shift, thus maintaining the exhaust port closed.

16 Claims, 3 Drawing Sheets

THREE-WAY THREE-POSITION SOLENOID VALVE

BACKGROUND OF THE INVENTION

This invention relates to electromagnetically operated valves, and more particularly to an improved dual solenoid valve. Even more particularly, this invention relates to an improved three-way dual solenoid coil valve having three operational positions and the capability of operating in either pulse-width modulation or on/off mode.

Application of various solenoid valve types may be seen in anti-lock braking systems and the newer electronic transmissions. In such applications, the solenoid valves are employed to accomplish the task of obtaining intermediate pressure levels from a constant high pressure source The two way solenoid valve disclosed in U.S. Pat. No. 5,076,538, for example, utilizes an adjustment member interposed between the valve and the surrounding housing to delay or prevent the valve from moving suddenly from its closed to its fully open position. This causes a slight throttling of fluid pressure until the latter stabilizes somewhat between the fluid inlet and outlet ports, respectively.

One particular solenoid valve that is used with electronic transmissions comprises a three-way two-position valve such as the one disclosed in U.S. Pat. No. 4,932,439. This valve utilizes pulse width modulation (PWM) effectively to switch between a build phase where pressure is increasing at its outlet port and a decay phase where pressure is decreasing at its outlet port. Such two position valves have several disadvantages such as, first, difficulty maintaining desired pressures due to constant oscillation between build and decay phases, second, the necessity of a fast microprocessor the cost of which increases with efficiency, and third, rapid opening and closing of valves with generally metal-to-metal contact increases valve wear and diminishes durability.

Still another type of solenoid valve utilizes a linear or variable force to achieve regulation of the desired pressure Although less efficient than pulse-width modulation solenoids, these solenoids operate at high frequencies (e.g. 250 Hz.) such that the solenoid rarely allows complete valve closure, but rather causes varying restrictions in the flow rate from the high pressure source and to the low pressure exhaust. This limits the problem of oscillating pressures. However, these solenoid valves also have several disadvantages such as, first, calibration of these solenoid valves is difficult and timely to effect, and second, these solenoid valves tend to be very expensive to manufacture and operate.

Also used for electronic transmissions is a three way, three position pressure actuated directional valve of the type disclosed in U.S. Pat. No. 4,674,613. The directional valve is controlled by a solenoid operated relief valve having a single armature movable into three positions corresponding to the amount of voltage applied to its surrounding solenoid coil. The U.S. Pat. No. 3,783,901 also discloses a pressure actuated valve controlled by a solenoid-operated member, and although the solenoid includes two separate coils, the latter are utilized simply to make the solenoid double-acting.

It is therefore an object of this invention to provide a solenoid valve capable of three operating positions which render the system more efficient when regulating fluid pressures.

It is also an object of this invention to provide a solenoid valve whose moving parts oscillate less frequently and therefore, will wear more slowly, thereby rendering the valve more durable.

Another object of this invention is to provide a three position solenoid valve having its valving operation within the coil area, therefore reducing the space required by such an assembly.

Yet another object of this invention is to provide a dual solenoid valve which has two separate armatures disposed coaxially one within the other, and is therefore less expensive to produce and utilize.

Other objects of this invention will become apparent hereinafter from the specification and the recital of the appended claims, particularly when considered in conjunction with the attached drawings.

SUMMARY OF THE INVENTION

A solenoid valve of the type embodied by the present invention comprises a cylindrically shaped casing having in one end thereof both an input port connected to a high pressure hydraulic fluid source and an output port connected to the hydraulically-operated equipment, and in the opposite end thereof an exhaust port connected to a sump or hydraulic fluid reservoir. Internal of the casing, a pair of solenoid coils are wound coaxially one within the other around a spool member which confines the valve assembly. The valve assembly comprises an exhaust valve communicating between the output port and exhaust port, and an input valve communicating between the input port and output port, whereby each valve may be independently actuated by means of first and second solenoid armatures, respectively. The first armature, which is reciprocable in an axial bore in the casing, has thereon an exhaust valve movable towards or away from the exhaust port. The first armature has therein an axial bore in which the second armature is slidably received for limited axial movement; and the second armature hasthereon an input valve which is movable towards or away from the input port.

The armatures are urged resiliently towards the exhaust port by a pair of compression springs. The compression spring engaging the second armature is smaller than that engaging the first armature and therefore is biased away from the input port by a smaller force than the first armature. Such an arrangement disposes the first and second armatures normally to maintain the input valve open and the exhaust valve closed. This is the BUILD phase where pressure is allowed to increase at the outlet port. When the first solenoid coil is energized, the axially aligned magnetic flux overcomes the force of the smaller compression spring, thereby causing the input valve to close while the exhaust valve remains closed. This is the HOLD phase where pressure is maintained at the outlet port. When both solenoid coils are energized, the axially aligned magnetic flux overcomes the force of both compression springs, thereby causing the input valve to close and the exhaust valve to open. This is the DECAY phase where pressure is allowed to decrease at the outlet port.

DETAILED DESCRIPTION OF THE PREFERRED EMBODIMENTS

Figure 1:
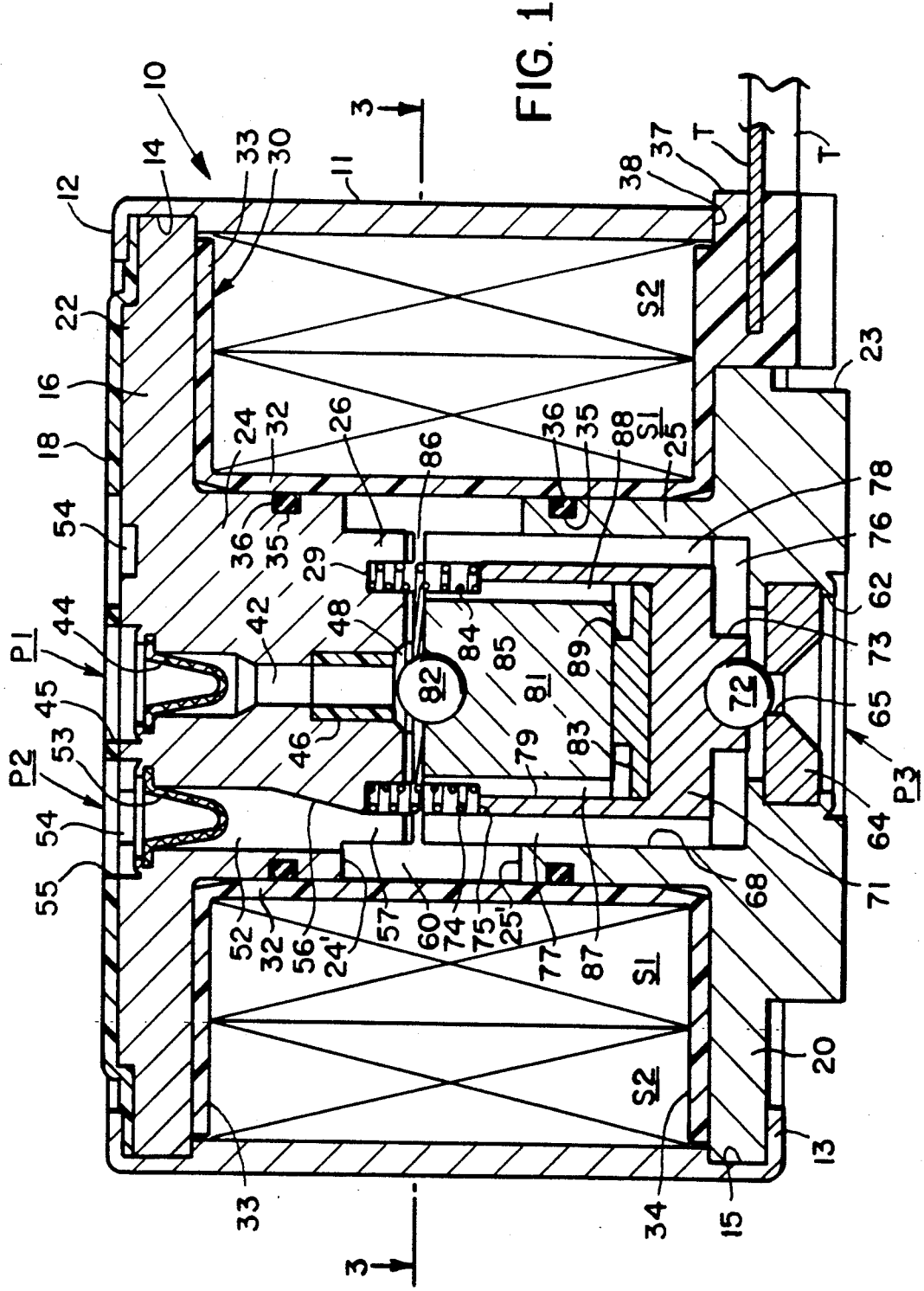
FIG. 1 is an axial sectional view taken through the center of a solenoid valve produced according to an embodiment of the present invention, the solenoid valve being shown in its deenergized state.
Figure 2:
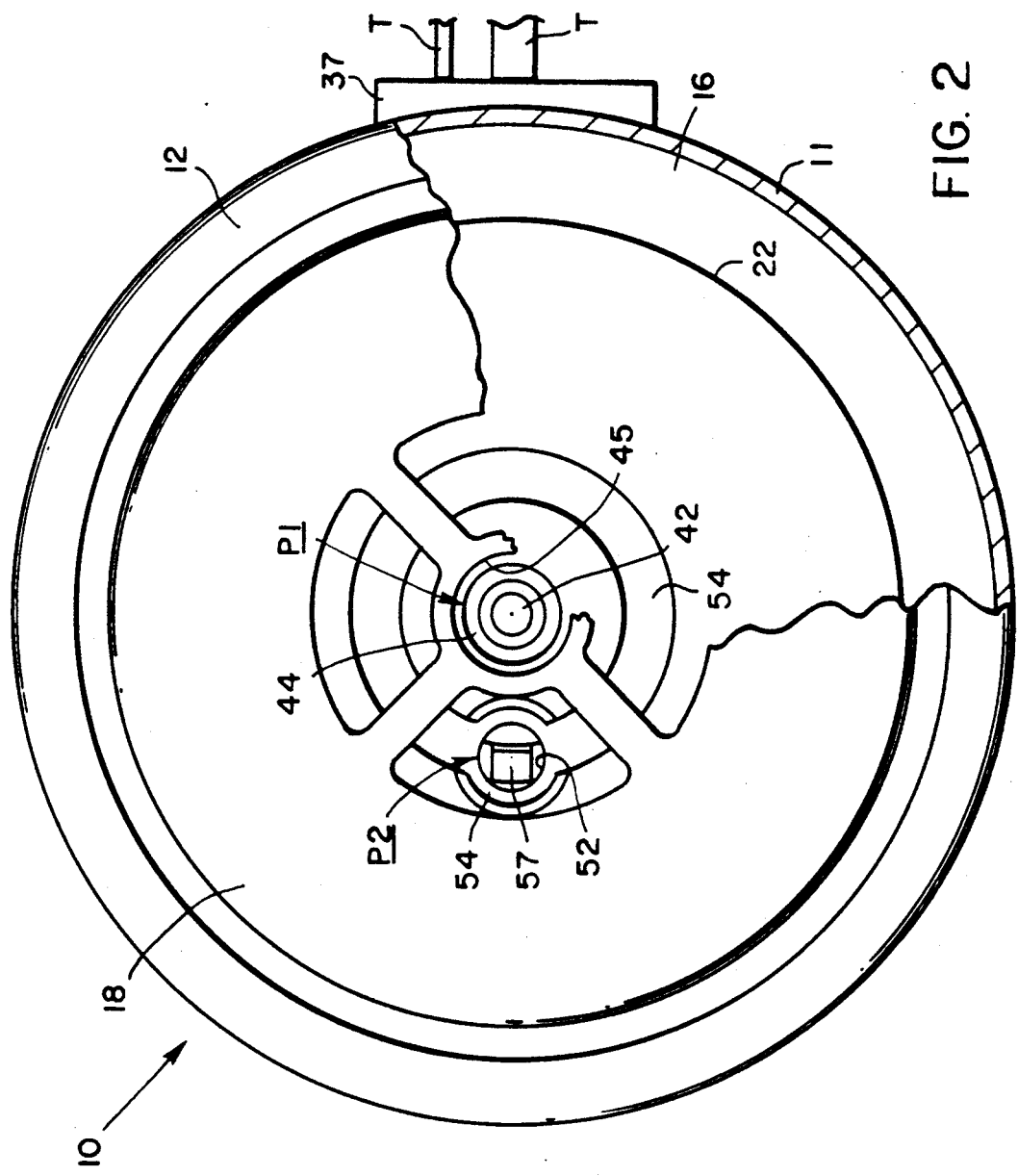
FIG. 2 is a plan view of this solenoid with portions thereof broken away and shown in section.
Figure 3:
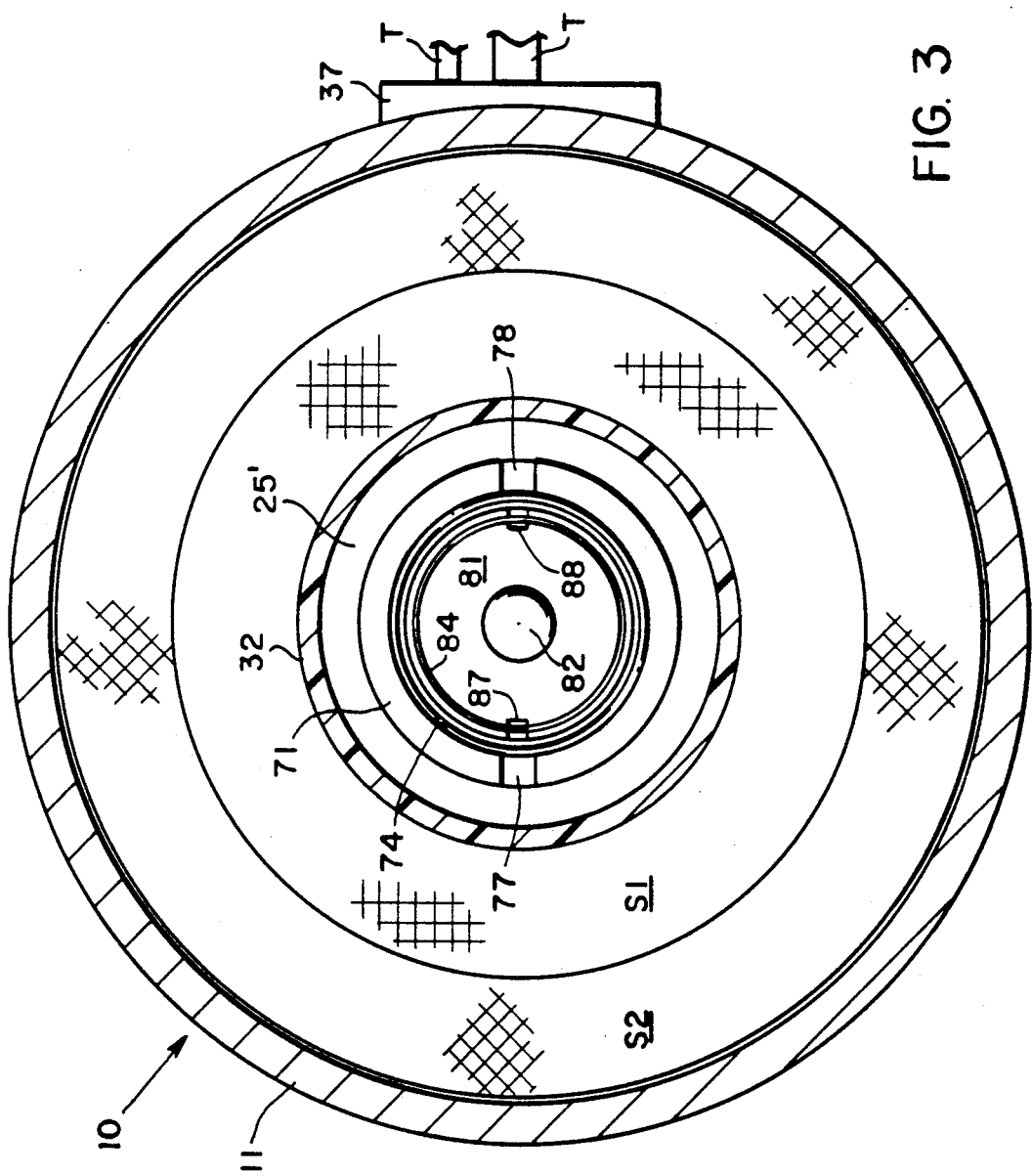
FIG. 3 is a cross section taken generally along line 3—3 in FIG. 1 looking in the direction of the arrows.

Referring now to the drawings by numerals of reference, 10 denotes generally a solenoid valve having an input port $P_1$ connected to a high pressure hydraulic fluid source, an output port $P_2$ which may be connected in a conventional manner to an automotive transmission or brake system or the like (not illustrated), and an exhaust port $P_3$ (FIG. 1) connected to an external hydraulic fluid reservoir or sump. Valve 10 comprises a cylindrical casing 11 which has inwardly bent circumferential flanges 12 and 13 on opposite ends thereof. Secured by these flanges coaxially in annular recesses 14 and 15 formed in the bore of casing 11 adjacent opposite ends thereof are two, generally disc shaped end walls 16 and 20. Flange 12 overlies and retains a gasket 18 over end wall 16 in recess 14, while flange 13 overlies and retains end wall 20 in recess 15. The end walls 16 and 20 have on their outer ends reduced-diameter head sections 22 and 23, respectively, and on their inner ends reduced-diameter, coaxially disposed hub sections 24 and 25, respectively. The respective inner ends 24' and 25' of hub sections 24 and 25 are disposed in axially spaced confronting relation to each other. Hub section 24 also has a reduced-diameter neck portion 26 projecting coaxially from its end face 24' toward hub section 25.

Seated between end walls 16 and 20, and surrounding their hub sections 24 and 25 within casing 11, is a plastic coil supporting spool 30. Spool 30 comprises a cylindrical body section 32 and circumferential end flanges 33 and 34, with section 32 confining hub sections 24 and 25. Each of the hub sections 24 and 25 has in its outer peripheral surface an annular recess or groove 35 that contains therein an O-ring 36 which effectively seal hub sections 24 and 25 to the spool body 32 in order to prevent any leakage of hydraulic fluid therebetween. Also, spool 30 has wound thereabout between flanges 33 and 34, and one within the other, a pair of solenoid coils $S_1$ and $S_2$, such that the inner coil $S_1$ is wound directly onto the spool body section 32, and the outer coil $S_2$ is wound about the inner coil. The lower spool flange 34, as shown in FIG. 1, has thereon an enlarged section 37 which projects through an opening 38 in case 11 to accomodate terminals T for use in energizing one of the solenoid coils. The manner in which coils $S_1$ and $S_2$ are connected to a power supply forms no part of this invention, and therefore will not be illlustrated in further detail herein.

In any event, both solenoid coils $S_1$ and $S_2$ have independent connections to a power source, and optionally, the two coils may also be connected to a common ground. In use, the connections between the coils $S_1$, $S_2$ and the power source are disposed to be regulated by a conventional microprocessor unit (not shown) which constantly monitors the required and existing hydraulic pressures at the outlet port $P_2$. Adjustment of the pressure is effected by the systematic opening and closing of the valves adjoining ports $P_1$ $P_2$ and $P_3$, as will be discussed in greater detail hereinafter.

Extending coaxially through end wall 16 and its hub and neck sections 24 and 26 is a bore 42, which has secured in its outer end a conventional filter element 44 and in its inner end an annular valve seat 46. Bore 42 communicates at its outer end through filter 44 with port $P_1$, as defined by an opening 45 in the gasket 18, and at its inner end through the bore in valve seat 46 with a flared counterbore 48, which is formed in the inner end of the neck section 26 to surround the adjacent end of valve seat 46.

Also extending through end wall 16 and its sections 24 and 26 in radially displaced parallel relation to bore 42 is another bore 52, which communicates at its upper end through a filter 53 with an annular recess 54 that is formed in the outer surface of end wall 16 coaxially of the central bore 42. Recess 54 in turn communicates with port $P_2$, which is defined by another circular opening 55 formed in the gasket 18 adjacent opening 45. Adjacent its lower end bore 52 narrows slightly, as shown in FIG. 1, thereby forming a slightly throttled outlet 56 that opens on an axially extending, rectangular slot 57 formed in the neck section 26 of wall 16 at one diametral side thereof. Outlet 56 and slot 57 open on an annular chamber 60 which is formed in the bore of spool 30 between the inner ends 24' and 25' of hub sections 24 and 25 as noted hereinafter.

Secured coaxially in an axial bore 62 in the head section 23 of end wall 20 is an annular valve seat 64. Valve seat 64 has therethrough an axial bore 65, which opens at its outer end on port $P_3$, as defined by the outer end of bore 62, and at its inner end opens coaxially on the inner end of a large counterbore 68 formed in the hub section 25 of end wall 20.

Slidably mounted in counterbore 68 coaxially thereof is a first cylindrical armature 71. On the end thereof facing valve seat 64 armature 71 carries a ball valve 72, which is secured in and projects from a recess in a reduced-diameter projection 73 on armature 71. A coiled compression spring 74, which is seated at one end in an annular recess 75 in the inner end of armature 71, and at its opposite end in a registering annular recess 29 in neck section 26 of end wall 16, urges armature 71 resiliently toward the position shown in FIG. 1. In this position valve 72 engages the inner end of valve seat 64 to close port $P_3$, and projection 73 is surrounded by an annular chamber 76 that is formed at the bottom of counterbore 68. Chamber 76 communicates with a pair of axial slots or grooves 77 and 78 that are formed in diametrally opposite sides of armature 71 to communicate at one of their ends with chamber 76, and at their opposite ends with chamber 60.

Slidably mounted for limited axial movement in a counterbore 79 formed in the inner end of armature 71 is a second, cylindrical armature 81. The inner end of armature 81 confronts upon a reduced-diameter cylindrical projection 80 formed on the upper face (FIG. 1) of a non-magnetic disc shaped spacer 83 that is seated in the bottom of counterbore 79. The outer end of armature 81 has therein a central recess in which is secured a ball valve 82 that confronts upon the inner end of annular valve seat 46 coaxially thereof. Another coiled compression spring 84, which is surrounded by spring 74, is seated at one end in recess 29 in neck section 26, and at its opposite end in an annular recess 85 formed coaxially around the outer end of armature 81. Like spring 74, spring 84 urges the second armature away from end wall 16, and toward the position shown in FIG. 1, wherein ball valve 82 is open. With valve 82 in this open position, ports $P_1$ and $P_2$ are placed in communication via bore 42, the bore in valve seat 46, an axial space 86 which exists at this time between the confronting ends of armature 81 and neck section 26 of end wall 16, the chamber 60 and the bore 52.

For a purpose noted hereinafter, the compression spring 84 is designed to be lighter or weaker than compression spring 74, so that the axial force that it exerts against armature 81 is less than the axial force exerted by spring 74 against armature 71. Also, when valve 82 is open, armature 81 is seated on the spacer projection 80. To minimize any tendency of armature 81 to adhere to spacer 83, armature 81 has at diametrally opposite sides thereof axially extending slots 87 and 88 which place space 86 and chamber 60 in communication with the annular space surrounding projection 80 on spacer 83.

Valves 72 and 82 are independently affected by the operation of armatures 71 and 81, respectively. For example, when coils $S_1$ and $S_2$ are deenergized springs 74 and 84 maintain valve 72 closed and valve 82 open. Counteracting the effects of compression springs 74 and 84 are solenoid coils $S_1$ and $S_2$, respectively, which selectively may be energized to apply electromagnetic force to the armatures 71 and 81 in opposition to the spring forces constantly applied thereto. By energizing coil $S_1$ armature 81 will be caused to move against the resistance of spring 84 towards valve seat 46, which will therefore close the port $P_1$. Similarly, energizing coil $S_2$ causes armature 71 with ball valve 72 thereon to be moved within bore 68 in a direction towards valve seat 46, which would open valve 72 and place port $P_2$ in communication with $P_3$. This system of independent armatures, therefore, allows only one of the valves 72 and 82 to remain open at a given moment during both the BUILD and DECAY phases, respectively, and allows both valves to remain closed at the same time during the case in the HOLD phase.

In operation, a microprocessor or other control device associated with valve 10 may indicate that increased hydraulic pressure is required at port $P_2$, whereby neither coil $S_1$ nor $S_2$ is to be energized. Therefore, the compression springs 74 and 84 will retain valve 82 open and valve 72 closed, so that fluid may enter port $P_1$ to increase the pressure at port $P_2$. This is the BUILD phase as illustrated in FIG. 1, and constitutes a first position of valve 10.

Subsequently, the microprocessor may signal that the pressure at port $P_2$ has reached equilibrium and needs to be maintained. At this point coil $S_1$ is energized to produce a magnetic flux having a density sufficient to force armature 81 upwardly in FIG. 1 to close valve 82 against the force of compression spring 84, but not great enough to shift armature 71 upwardly against the force of compression spring 74. This effectively closes inlet valve 82 and allows exhaust valve 72 to remain closed so that the fluid pressure may be maintained constant at port $P_2$. This is the second position of valve 10 and constitutes the HOLD phase.

Alternatively, or following the HOLD phase, the microprocessor may signal that the pressure at port $P_2$ is too high, whereby both coils $S_1$ and $S_2$ are energized to produce a magnetic flux having a density sufficient to apply a force to both armatures 71 and 81 that is greater than the combined force of compression springs 74 and 84. This shifts both armatures 71 and 81 upwardly from the positions shown in FIG. 1, and effectively closes valve 82 and opens valve 72, whereby fluid is allowed to flow from port $P_2$ and through port $P_3$ to an external fluid reservoir or sump. This third position of valve 10 constitutes the aforementioned DECAY phase of operation.

The above described three-way solenoid valve may operate in two different modes, either on/off or pulse-width modulation (PWM). In the on/off mode the microprocessor signal will be acted upon quickly and efficiently to effect the pressure at the outlet port $P_2$, whereas in the PWM mode the microprocessor signal will be more frequent, thereby assessing the pressure requirement and the pressure status at port $P_2$ at a frequency of for example 100 Hz so that pressure adjustments may be effected more gradually.

From the foregoing, it should be apparent that the present invention provides a three-position solenoid valve that requires a less powerful microprocessor due to the tri-phasic operation thereof which obviates the need of high frequency signals. Also, the present invention provides a more accurate means for regulating pressure at the solenoid outlet port, which may be connected to an automotive transmission or brake system. Finally, it should be apparent that due to the less frequent changes between the BUILD-HOLD-DECAY phases, less wear of the valve assemblies will occur, thereby rendering the solenoid valve produced according to the present invention much more durable than its predecessors.

Although the present invention has been described in detail with regards to ball valves 72 and 82 engaging valve seats 64 and 46, respectively, it should be apparent to those skilled in the art or the appended claims that other valve closure means may be incorporated into the solenoid valve without departing from the scope of this invention. Moreover, it will be equally apparent that which of ports $P_1$ and $P_3$ is normally open or normally closed is but a matter of choice, and can be reversed from the illustrated embodiment without departing from the scope of this invention.

While this invention has been illustrated and described in detail in connection with only certain embodiments thereof, it will be apparent it is capable of still further modifications, and that this application is intended to cover any such modifications as may fall within the scope of one skilled in the art or the appended claims.

I claim:

1. A solenoid actuated three-way three-position valve, comprising
    a housing having therein an inlet port disposed to be connected to a supply of fluid under pressure, an outlet port disposed to be connected to a fluid pressure operated system, and an exhaust port disposed to be connected to a sump,
    a first valve mounted in a bore in said housing for movement between an open position to place said inlet and outlet ports in communication with each other, and a closed position to interrupt communication between said inlet and outlet ports,
    a second valve mounted in said bore in said housing for movement between an open position to place said outlet and exhaust ports in communication with each other, and a closed position to interrupt communication between said outlet and exhaust ports,
    means normally urging each of said valves in the same direction from one to the other of its open and closed positions, respectively, and electromagnetic means in said housing operable to move each of said valves selectively, and independently of one another, from said other position to said one position thereof, said electromagnetic means including a pair of selectively energizable solenoid coils mounted in said housing to surround said bore, one of said coils being wound coaxially within the other of said coils, and each of said coils being operative upon being energized to move one of said first and second valves from said other position to said one position thereof.

2. A solenoid actuated valve as defined in claim 1, wherein said electromagnetic means further includes, a pair of armatures connected to said valves, one of said armatures being operative upon energization of said one of said coils to effect movement of said first valve from said other to said one position thereof, and the other of said armatures being operative upon energization of said other of said coils to effect movement of said second valve from said other to said one position thereof.

3. A solenoid actuated valve as defined in claim 2, including means mounting each of said armatures in said bore in said housing for reciprocation along a common axis and respectively in one direction, when said coils are energized, and in the opposite direction when said coils are deenergized, and said armatures being reciprocable along said common axis independently of each other.

4. A solenoid actuated valve as defined in claim 3, wherein said one armature is mounted in an axial recess in one end of said other armature for limited reciprocation therein axially of the axis of said recess.

5. A solenoid actuated valve as defined in claim 4 including a non-magnetic spacer element mounted in the bottom of said recess in said other armature to extend between said bottom of said recess and the adjacent end of said one armature.

6. A solenoid actuated valve as defined in claim 3, wherein said inlet and exhaust ports are formed in said housing adjacent opposite ends, respectively, of said bore in said housing, and each of said armatures carries one of said valves for movement thereby to and from its closed position with respect to one of said inlet and outlet ports, respectively.

7. A solenoid actuated valve as defined in claim 6, wherein said means normally urging said valves from said one to said other of said positions comprises a pair of springs interposed between said armatures and said housing, said first valve is secured to said one armature for movement thereby, and said second valve is secured to said other armature for movement thereby, one of said springs urges said one armature in a direction to cause said first valve to be in its open position when said one coil is deenergized, and the other of said springs urges said other armature in a direction to cause said second valve to be in its closed position when said other coil is deenergized.

8. A solenoid actuated valve as defined in claim 7, wherein said other spring is stronger than said one spring, whereby when said one coil is energized and said other coil is deenergized, said first valve is moved to its closed position and said second valve remains in its closed position.

9. A solenoid actuated three-way three-position valve, comprising a housing having a pair of spaced end walls each of which has therethrough a port which communicates with a valve chamber formed in said housing between said end walls, a pair of armatures mounted in said chamber to reciprocate independently of each other between first and second limit positions, respectively, and with one of said armatures being mounted at one end thereof for limited axial reciprocation in a recess formed in one end of the other of said armature, resilient means interposed between said housing and said armature and operative resiliently to urge said armatures toward said first limit positions thereof, a pair of solenoid coils wound in said housing to surround said chamber and energizable selectively to move said armatures from said first to said second limit positions thereof, a first valve connected to said one armature to be held thereby in one of open and closed positions, respectively, relative to one of said ports when said coils are deenergized, and a second valve connected to said other armature to be held thereby in one of open and closed positions, respectively, relative to the other of said ports when said coils are deenergized.

10. A solenoid actuated valve as defined in claim 9, wherein said solenoid coils are operative, when both are energized, to move both of said armatures in the same direction thereby to move said valves from said one to the other of said open and said closed positions thereof, respectively.

11. A solenoid actuated valve as defined in claim 10, wherein one of said coils is operative, when energized at a time when the other coil is deenergized, to move said one armature in said same direction without moving said other armature.

12. A solenoid actuated valve as defined in claim 11, wherein said resilient means comprises a first compression spring interposed between said housing and said one armature normally to retain said one armature in its first limit position when said one coil is deenergized, and a second compression spring interposed between said housing and said other armature normally to retain said other armature in its first limit position when the other of said coils is deenergized, said second compression spring being stronger than said first spring whereby upon energization of said one coil only, said second spring retains said other armature in its first limit position.

13. A solenoid actuated valve as defined in claim 9, wherein said first valve is secured to the opposite end of said one armature for movement thereby toward and away from said one port, and said second valve is secured to the opposite end of said other armature for movement thereby toward and away from said other port.

14. A solenoid actuated valve as defined in claim 13, wherein a non-magnetic spacer element is mounted in the bottom of said recess in said other armature to confront said one end of said one armature, and said one armature has in its outer periphery at least one axially extending slot opening at one end on said spacer element and communicating at its opposite end with said one port when said first valve is in its open position.

15. A solenoid actuated valve as defined in claim 9, wherein said housing has therein a third port communicating with said one port when said coils are deenergized, and communicating with said other port when said coils are energized.

16. A solenoid actuated valve as defined in claim 9, wherein one of said coils is wound coaxially within the other of said coils.

* * * * *

UNITED STATES PATENT AND TRADEMARK OFFICE
CERTIFICATE OF CORRECTION

PATENT NO. : 5,218,996
DATED : June 15, 1993
INVENTOR(S) : Eric J. Schmitt-Matzon It is certified that error appears in the above-indentified patent and that said Letters Patent is hereby corrected as shown below:

On the Title page, items [19] and [54], change "Schmitt-Matzon" to --Schmitt-Matzen--.

Signed and Sealed this

Eleventh Day of January, 1994

Attest:

BRUCE LEHMAN

*Attesting Officer*     *Commissioner of Patents and Trademarks*